Patented Sept. 16, 1930

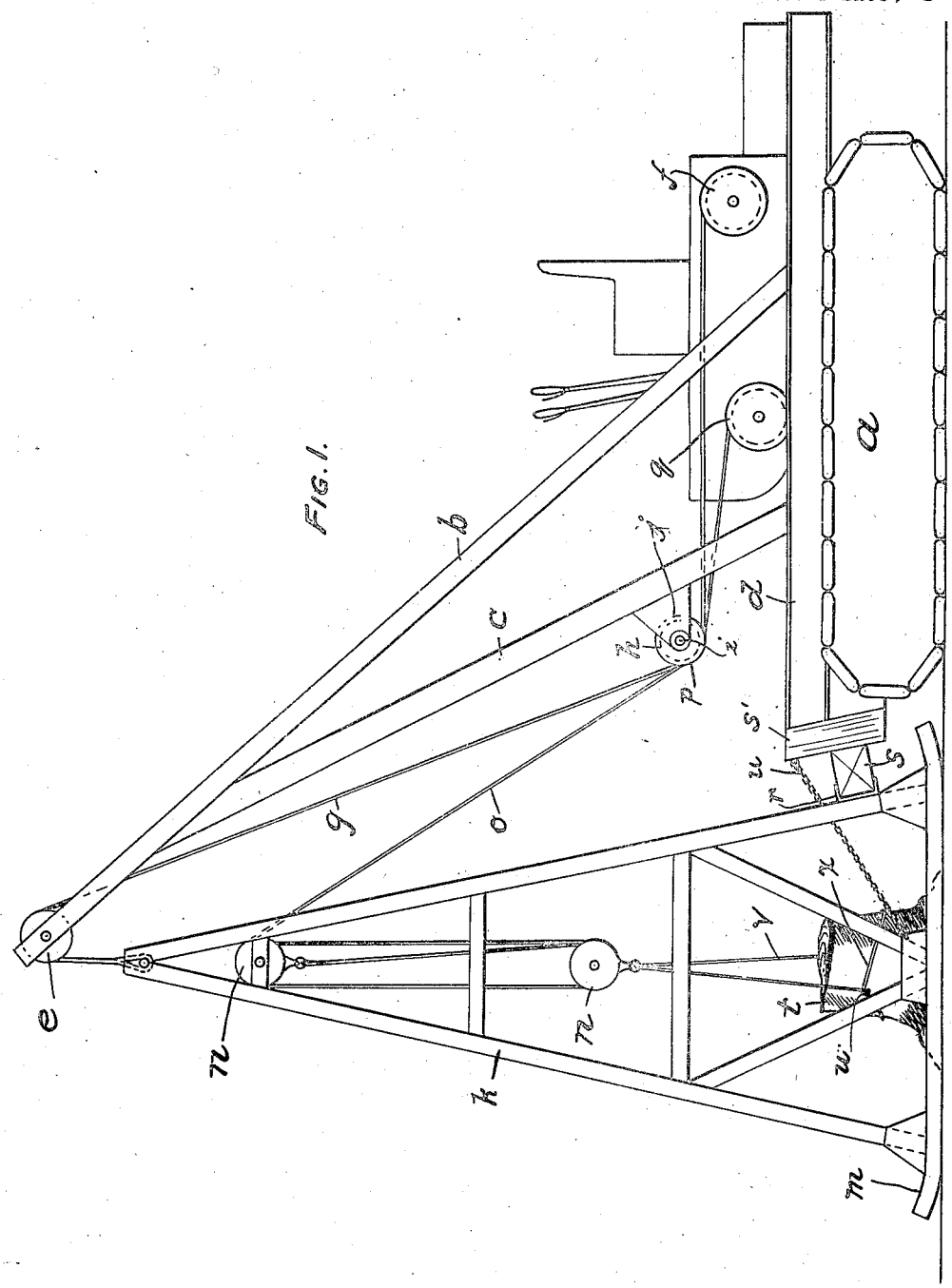

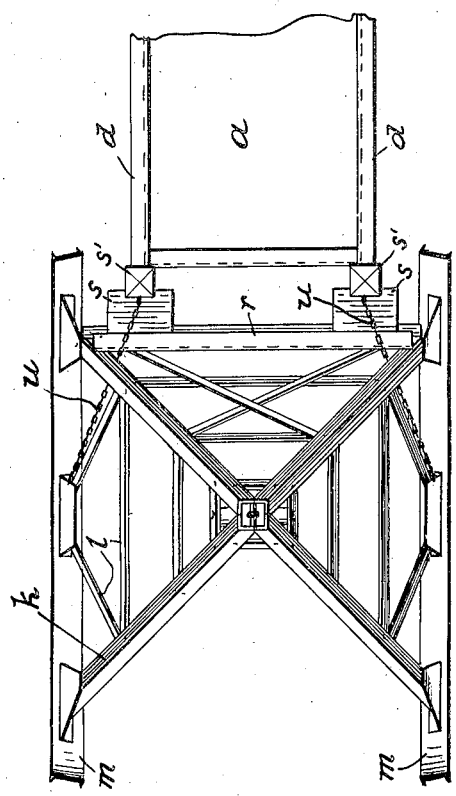
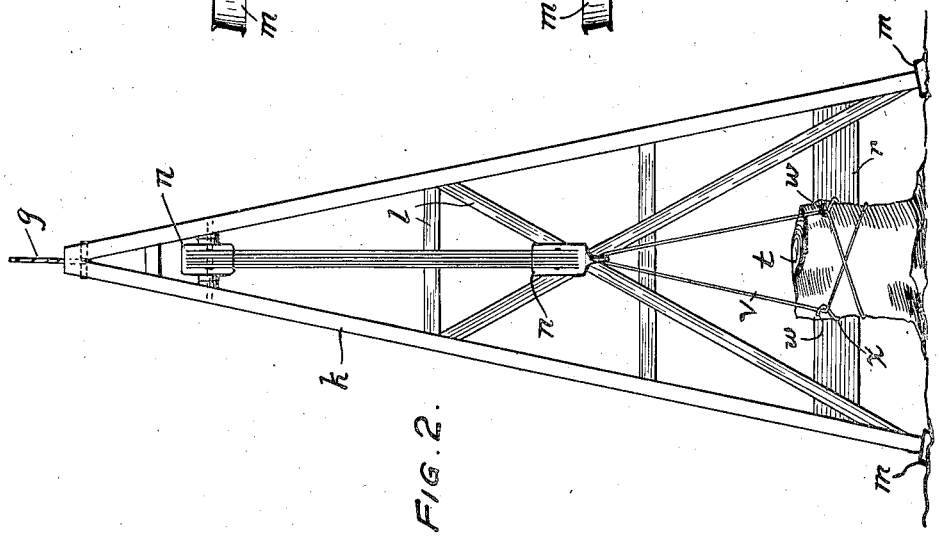

1,776,089

UNITED STATES PATENT OFFICE

ABRAHAM A. SHIMER, OF WILMINGTON, DELAWARE, ASSIGNOR TO HERCULES POWDER COMPANY, OF WILMINGTON, DELAWARE, A CORPORATION OF DELAWARE

APPARATUS FOR PULLING STUMPS

Application filed September 13, 1927. Serial No. 219,186.

My invention relates to an improved apparatus for pulling stumps.

Heretofore various forms of apparatus have been designed for the purpose of pulling stumps and such apparatus has for ordinary purposes been found satisfactory. However, when stumps to be pulled are of relatively large size and when large numbers of stumps are to be pulled in a minimum of time, as for example, in the harvesting of pine stumps for the recovery of turpentine, rosin, etc., therefrom, such apparatus as has heretofore been designed does not give satisfaction, since such apparatus either lacks the requisite power or the requisite mobility.

In the harvesting of pine stumps in connection with the extraction of turpentine, rosin etc. therefrom, it has been customary to utilize dynamite for the removal of the stumps because of the lack of suitable stump pulling apparatus. The use of dynamite, aside from the danger involved, is uneconomic since its use enables the recovery of only about one-half of the wood in the stump. The bulge from which the lateral roots radiate, is rich in turpentine and rosin. Some of this bulge, most of the laterals and all of the tap root are left in the ground.

Now it is the object of my invention to provide an improved apparatus for pulling stumps which will enable the application of great power to a stump and which will be readily moved about, thus enabling large stumps including the lateral and tap roots to be pulled bodily from the ground and permitting the apparatus to be quickly moved from stump to stump.

Having now indicated, in a general way, the nature and purpose of my invention, I will proceed to a detailed description thereof with reference to the accompanying drawing in which:—

Fig. 1 is a side view of an apparatus embodying my invention in association with a tractor.

Fig. 2 is an end view of the apparatus shown in Fig. 1.

Fig. 3 is a plan view of the apparatus.

In the drawings $a$ indicates a tractor, shown as of an endless tread type, but which may be of any desired type. On the tractor is supported a boom $b$ suitably braced by means of braces $c$ and provided at its upper end, which extends beyond the front end of the tractor frame $d$, with a sheave $e$. The tractor supports a winding drum $f$ adapted to be driven by the tractor engine and on which is wrapped a cable $g$. The cable $g$ is led from the drum $f$ under a sheave $h$, mounted on a shaft $i$ supported by brackets $j$ secured to the braces $c$, and then up and over the sheave $e$. The free end of cable $g$ is secured to the apex of a tower made up of upright members $k$ suitably braced by means of braces $l$. The framework is provided with parallel runners $m$ formed from channel section and tipped laterally. The runners are suitably secured to the lower ends of adjacent upright members $k$. Supported from adjacent the apex of the A frame are a pair of blocks $n$, for example, a pair of four-sheave blocks through which is run a cable $o$, one end of which is secured to the upper block and the other end of which is led under a sheave $p$ adjacent to sheave $h$ and then wound on a winding drum $q$ mounted on the tractor and adapted to be driven by the tractor engine.

The opposite upright members $k$ adjacent to the front end of the tractor are cross-braced adjacent their lower ends by means of a channel member $r$, which serves to support chafing blocks $s$, which bear against chafing blocks $s'$ secured to the forward end of the frame of the tractor. A pair of chains $u$ are secured at their ends to the chafing blocks $s'$ and to the frame.

It will now be observed that by winding in the cable $g$ the A frame supporting the blocks $n$ may be raised off the ground and readily moved by operation of the tractor to place it over a stump $t$ to be pulled. When the frame is in raised position, the lower end will be steadied by the engagement of chafing blocks $s$ with blocks $s'$, the latter being of a length such as to receive blocks $s$ in all positions of the A frame and side swing will be prevented by chains $u$ extending from the A frame to the tractor as shown in Figures 1 and 3. When the A frame is positioned over a stump it is lowered by slacking off on cable $q$ so that the runners $m$ rest on the ground and in which position the chafing blocks $s$ will be positioned opposite to the blocks $s'$.

In order to pull the stump $t$ the lower block $n$ is connected to the stump through the medium of a loop of cable $v$. The loop of cable $v$ encircles the stump and is engaged with hooks $w$ on the ends of a cable $x$, which partially encircles the stump and the ends of which are separated. When the lower block $n$ is secured to the stump the cable $o$ is wound in by operating drum $q$. As cable $o$ is wound in, the power applied by the drum is multiplied by the blocks $n$ and applied to the stump through the loop of cable $v$, which encircles and is secured to the stump by engagement with the hooks on the end of the cable $x$, which when strain is put on it is drawn tightly about the stump.

The strain necessary to pull the stump $t$ is resisted by the tower, which, as has been indicated, has a bearing on the ground.

It will now noted that by virtue of my invention an apparatus for pulling stumps is provided by which a given degree of power is multiplied as applied to a stump and in which the strain of pulling the stump is adequately distributed and absorbed and, at the same time, an apparatus which may be readily moved from place to place.

Having now fully described my invention, what I claim and desire to protect by Letters Patent is:

1. Apparatus for pulling stumps including in combination, a tractor, a frame structure independent of the tractor and adapted to be positioned over a stump, a block and tackle supported from the frame structure and adapted to be connected to a stump, means carried by the tractor for raising the frame structure clear of the ground, a hoisting device carried by the tractor and adapted to actuate the tackle to draw a stump, flexible connections between the tractor and frame structure and chafing blocks carried by the tractor and frame structure whereby the frame structure is guided and braced from the tractor.

2. Apparatus for pulling stumps including in combination, a tractor, a frame structure independent of the tractor, a hoisting device on the tractor, means affording a connection between the top of the frame structure and said hoisting device whereby said frame structure may be raised bodily and supported from the tractor and lowered to rest on the ground, a chafing block carried by the frame structure adjacent its base and adapted to engage the tractor, a block and tackle supported from said frame structure, means for connecting said block and tackle to a stump and a second hoisting device carried by the tractor and adapted to actuate the tackle to draw a stump.

In testimony of which invention I have hereunto set my hand at Wilmington, Delaware, on this 9th day of Sept., 1927.

ABRAHAM A. SHIMER.